United States Patent [19]

Hill

[11] Patent Number: 4,529,180
[45] Date of Patent: Jul. 16, 1985

[54] THERMALLY EFFICIENT SHOCK ABSORBER

[75] Inventor: Robert L. Hill, Sepulveda, Calif.
[73] Assignee: Menasco Inc., Burbank, Calif.
[21] Appl. No.: 575,315
[22] Filed: Jan. 30, 1984
[51] Int. Cl.³ .......................... B64C 25/60; F16F 9/52
[52] U.S. Cl. ................................ 267/64.28; 188/276;
188/283; 188/315; 188/322.14; 188/322.21;
244/104 FP
[58] Field of Search ............... 267/64.15, 64.16, 64.25,
267/64.28, 120; 188/276, 277, 278, 283, 313,
314, 315, 316, 317, 322.13, 322.14, 322.19,
322.21; 92/1; 244/104 FP

[56] References Cited

U.S. PATENT DOCUMENTS

| | | | |
|---|---|---|---|
| 3,469,661 | 9/1969 | Hoffmann et al. | 188/317 X |
| 3,944,197 | 3/1976 | Dachicourt | 188/276 X |
| 3,970,292 | 7/1976 | Dachicourt et al. | 267/64.28 |
| 4,004,762 | 1/1977 | Jenkins | 244/104 FP |

*Primary Examiner*—Bruce H. Stoner, Jr.
*Assistant Examiner*—Richard R. Diefendorf

[57] ABSTRACT

A thermally efficient shock absorber comprising a strut housing having an open end and a closed end, a piston including a piston housing and a piston head slideable in the strut housing, and a preselected volume of fluid and gas located in the strut and piston housings. A compensating system is provided coupled to the fluid for maintaining a constant fluid-to-gas volume ratio irrespective of thermal variations and a valve is provided for isolating the compensating system from the fluid. In a particular embodiment of the invention, the compensating system includes a gas compensating chamber and a fluid compensating chamber having a movable separator piston therebetween, the fluid compensating chamber being coupled to the fluid in the strut and piston housings. The gas and fluid compensating chambers are contained within the strut housing separate from the gas and fluid in the strut and piston housings. A position indicator is coupled to the valve for causing the valve to isolate the compensating system from the fluid when the shock absorber is positioned to receive loads.

11 Claims, 5 Drawing Figures

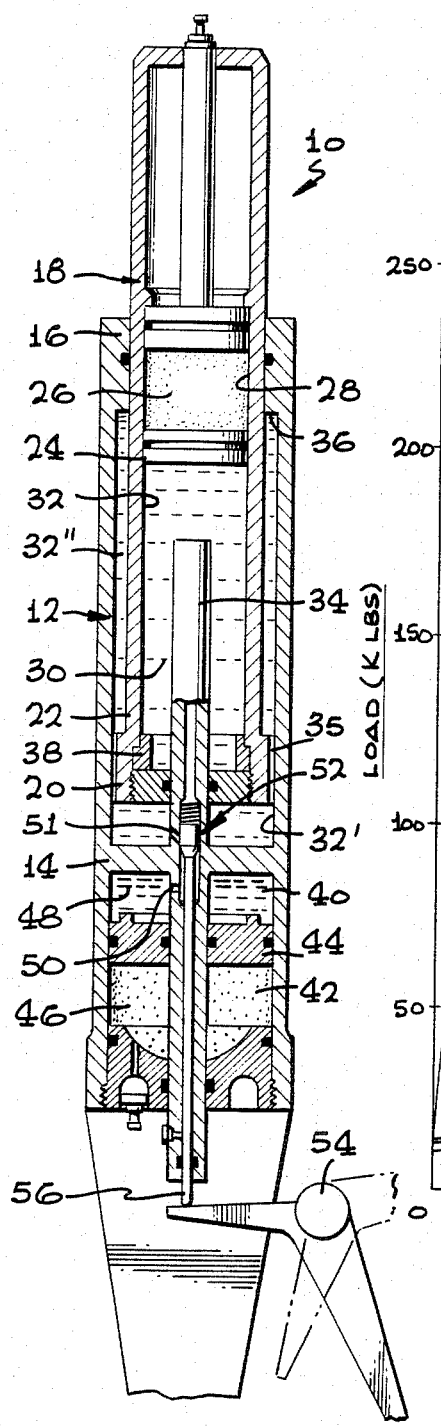

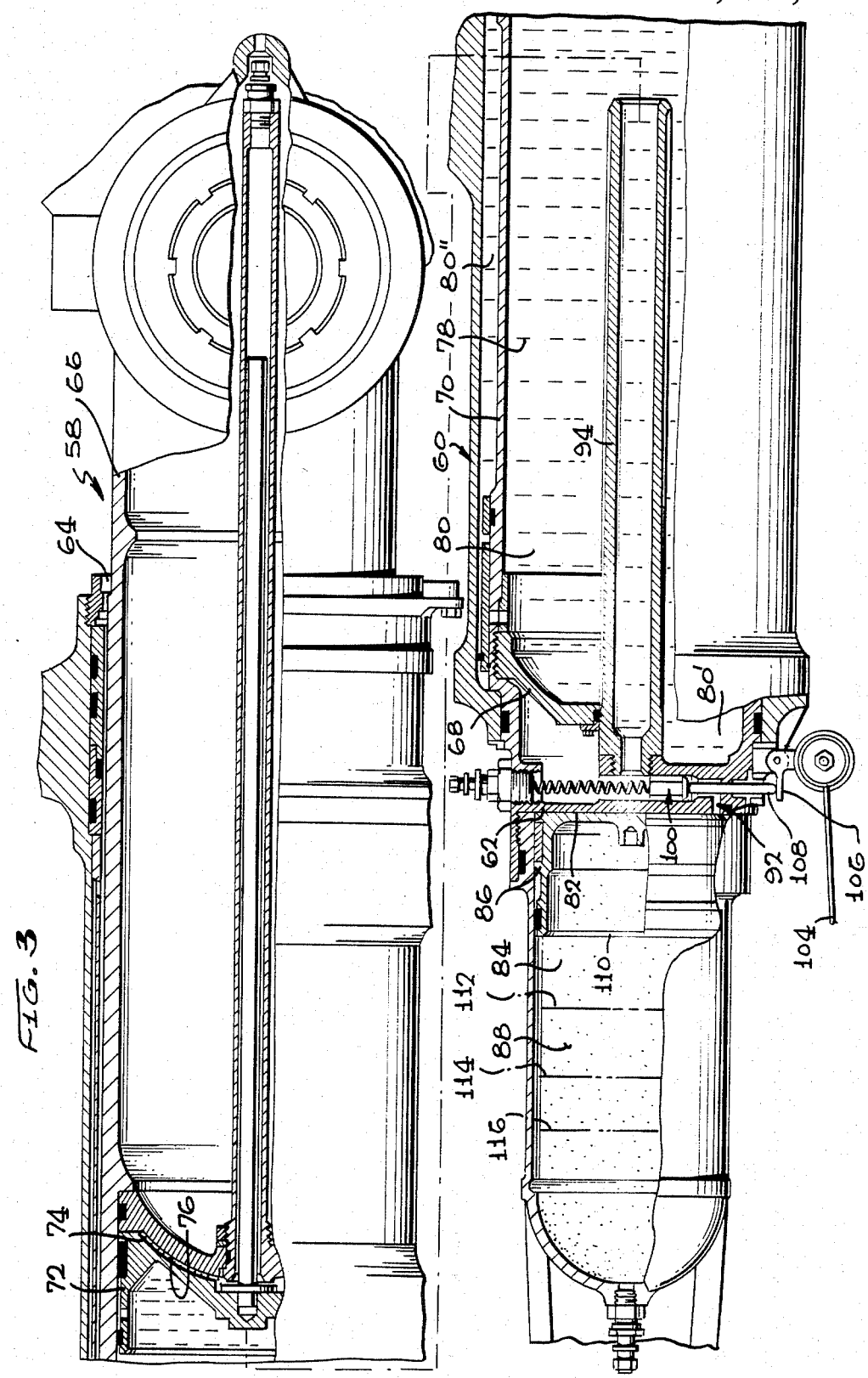

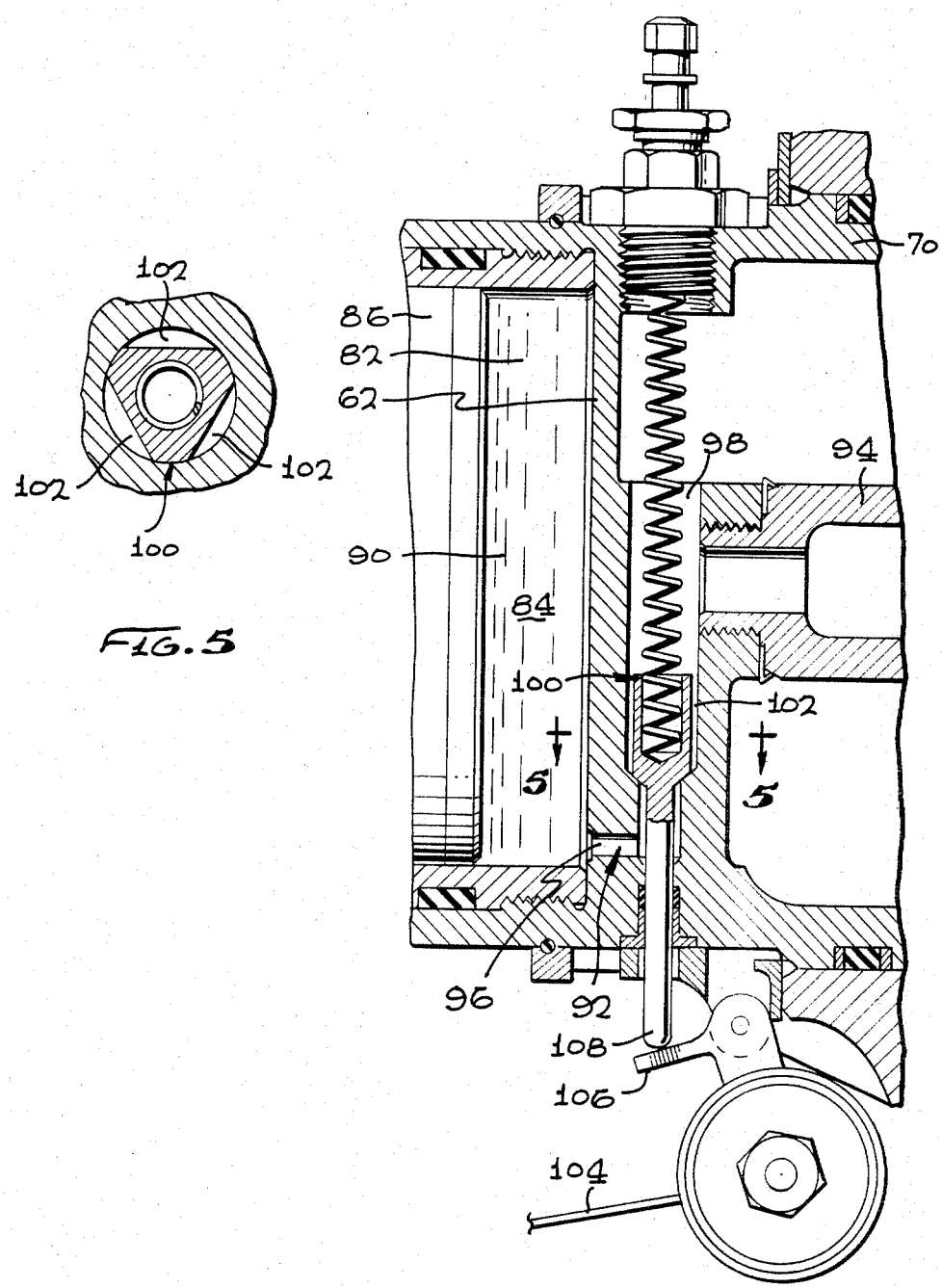

THERMALLY EFFICIENT SHOCK ABSORBER

TECHNICAL FIELD

The invention relates to the field of shock absorbers and, in particular, to a shock absorber in which the effects of temperature changes on shock absorber efficiency on landing are greatly reduced.

BACKGROUND ART

In the design of shock absorbers, a particular fluid/gas compression ratio for landing is chosen to provide optimization of the shock absorbing capabilities of the shock absorber. However, the shock absorbing capabilities of a conventional shock absorber are markedly affected by temperature changes. This is due to changes in the fluid/gas compression ratio caused by thermal variations. When the ambient temperature changes cause a change in the temperature of the shock absorber, the fluid inside the shock absorber expands or contracts according to a temperature increase or decrease, respectively. Since the fluid is essentially incompressible and there is a fixed total volume of fluid/gas inside the shock absorber, if the temperature changes the volume of the fluid increases or decreases, thereby causing the volume of the gas to decrease or increase, respectively. This temperature change thus alters the compression ratio of the shock absorber. If the temperature increases, the compression ratio increases and the shock absorber becomes "stiffer". Conversely, if the temperature decreases, the compression ratio decreases and the shock absorber becomes "softer". These changes can seriously impact the landing loads imposed on an airplane structure and the landing characteristics of the airplane, such as the maximum allowable landing weight of the airplane, which affects its load carrying capabilities, and the vertical descent speed at which the airplane can land, which restricts its flight patterns.

Accordingly, it is a general object of the present invention to provide an improved shock absorber.

It is another aspect of the present invention to provide a shock absorber which is thermally efficient.

It is a further advantage of the present invention to provide a shock absorber in which the effects of temperature changes on shock absorber efficiency are greatly reduced.

It is still another object of the present invention to provide a shock absorber in which the fluid/gas compression ratio is substantially unaffected by thermal variations.

DISCLOSURE OF INVENTION

A thermally efficient shock absorber is provided. The shock absorber comprises a strut housing having an open end and a closed end, a piston including a piston housing and a piston head slideable in the strut housing, and a preselected volume of fluid and gas located in the strut and piston housings. Compensating means is provided coupled to the fluid for maintaining a constant fluid-to-gas volume ratio irrespective of thermal variations, and valve means is provided for isolating the compensating means from the fluid. In a particular embodiment of the invention, the compensating means includes a gas compensating chamber and a fluid compensating chamber having a movable separator piston therebetween, the fluid compensating chamber being coupled to the fluid in the strut and piston housings. The gas and fluid compensating chambers are contained within the strut housing separate from the gas and fluid in the strut and piston housings. Position indicator means is coupled to the valve means for causing the valve means to isolate the compensating means from the fluid when the shock absorber is positioned to receive loads.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 is a cross-sectional diagrammatic elevation view of a first embodiment of the present invention.

FIG. 2 illustrates in graphic form the advantages of the present invention.

FIG. 3 is a cross-sectional elevation view of a second embodiment of the present invention.

FIG. 4 is an enlarged fragmentary view of the valve means of the second embodiment of the present invention.

FIG. 5 is a cross-sectional view taken along line 5—5 of FIG. 4.

BEST MODE FOR CARRYING OUT THE INVENTION

Referring now to FIG. 1, a cross-sectional diagrammatic elevation view of a first embodiment of the present invention is illustrated. The shock absorber 10 has a strut housing 12 with a closed end 14 and an open end 16. A piston 18 having a piston head 20 and a piston housing 22 is slideable within the strut housing 12. The piston housing 22 has a moveable separator 24 therein to separate the pressurized gas 26 in gas chamber 28 from the hydraulic fluid 30 in fluid chambers 32, 32' and 32". In operation, the hydraulic fluid 30 flows between chambers 32, 32' and 32" via metering pin 34 and passageway 35 and the position of separator 24 changes as external forces move the piston 18 within the strut housing 12. When the external forces are removed from the shock absorber 10, the piston 18 extends until the piston head 20 bottoms on stop 36 on the open end 16 of the strut housing 12. The separator 24 in turn moves up and bottoms against stop 38 in the piston housing 22 due to the pressure of the gas 26 in the gas chamber 28.

In accordance with the present invention, the strut housing 12 is extended beyond the closed end 14 to provide for a fluid compensating chamber 40 and a gas compensating chamber 42 separated by moveable separator piston 44. The gas 46 in the gas compensating chamber 42 is kept at a lower pressure than the gas 26 in the gas chamber 28 so that the moveable separator 24 will always stay bottomed against stop 38 when external forces are removed. The hydraulic fluid 48 in the fluid compensating chamber 40 communicates with the hydraulic fluid 30 in the fluid chambers 32, 32', 32" via passageway 50 in the closed end 14, passageway 51, and the hollow metering pin 34. A spring-loaded valve 52 is positioned in the passageway 50 and is held open when external forces are removed, as may be done, for example, by the position of a jury brace 54 acting on rod 56 when a landing gear (not shown) which incorporates shock absorber 10 is in the retracted or stowed position.

It can be thus seen that when the valve 52 is open, hydraulic fluid 30, 48 is free to flow in either direction between fluid chambers 32, 32', 32" and fluid compensating chamber 40. If the fluid 30, 48 expands due to an increase in temperature, the excess fluid 30 in fluid chambers 32, 32', 32" will flow into the fluid compensating chamber 40 causing separator piston 44 to move and compress gas 46 in the gas compensating chamber 42. Conversely, if the fluid 30, 48 contracts due to a decrease in temperature, the fluid 48 will flow from the fluid compensating chamber 40 into the fluid chambers 32, 32', 32". This provides a constant volume of gas 26 in the gas chamber 28 and a constant volume of fluid 30 in the fluid chambers 32, 32', 32" and therefore a fixed or constant compression ratio. When external forces are about to be applied to the shock absorber 10, such as during an airplane landing when the landing gear is extended for landing, the jury brace 54 is moved by the landing gear to cause the rod 56 to allow the valve 52 to close and isolate the fluid compensating chamber 40 from the chambers 32, 32', 32".

Because of the above configuration, the shock absorber fluid/gas volumes and pressure are always in the proper ratio for the most efficient shock absorption regardless of temperature. In FIG. 2, adiabatic load versus stroke curves are illustrated showing the advantages of the present invention. At a dynamic limit load of 130,000 lbs. at 107° F., only 12.9 inches of stroke can be utilized from the 16 inches of stroke available without the use of the compensating chambers. With the use of the compensating chambers, 14.4 inches of stroke become available. This increase in available stroke of 1.5 inches yields superior shock absorber performance and more energy absorption capability. In addition, the effects of temperature changes are greatly reduced yielding consistent operating characteristics under different temperature conditions. Thus a significant decrease in the maximum load that the shock absorber and the aircraft feels can be achieved because of the added stroke available by essentially holding the adiabatic load versus stroke curve in one area regardless of ambient and shock absorber temperatures. FIG. 2 also illustrates compensated and uncompensated dynamic landing load versus stroke curves and demonstrates the increased energy absorption available and lower loads with the present invention due to the extra available stroke.

A second embodiment of the invention is illustrated in FIGS. 3, 4 and 5. The shock absorber 58 has, as in the first embodiment, a strut housing 60 with a closed end 62 and an open end 64. Piston 66 has a piston head 68 and a piston housing 70 slideable within the strut housing 60. The piston housing 70 has a moveable separator 72 therein to separate the pressurized gas 74 in gas chamber 76 from the hydraulic fluid 78 in fluid chambers 80, 80', 80". Fluid compensating chamber 82 and gas compensating chamber 84 are separated by moveable separator piston 86. The gas 88 in gas compensating chamber 84 is expanded or compressed by the moveable separator piston 86 as the fluid 90 and the fluid 78 expands or contracts due to thermal variations. In this embodiment, the fluids 78 and 90 communicate via passageway 92 in the closed end 62 and the hollow metering pin 94. The passageway 92 comprises channels 96 and 98 in the closed end 62. Channel 98 has a spring-loaded valve 100 positioned therein having passageways 102 to allow the flow of fluid from channel 96 to channel 98 and to metering pin 94 when the valve 100 is in the open position. As before, valve 100 is held open when external forces are removed by the position of a jury brace, not shown, acting on cable 104, which causes arm 106 to pivot and push the rod portion 108 to unseat the valve 100. The position of the edge 110 of the moveable separation piston 86 when the ambient and shock absorber fluid temperature is −30° F., 70° F. and 107° F. are shown by numerals 112, 114 and 116, respectively.

Having described the invention, it is obvious that numerous modifications and departures may be made by those skilled in the art. Thus, the invention is to be construed as being limited only by the spirit and scope of the appended claims.

INDUSTRIAL APPLICABILITY

The thermally efficient shock absorber is useful in reducing the impact of landing loads on an aircraft structure.

I claim:

1. A thermally efficient shock absorber comprising:
a strut housing having an open end and a closed end and at least one chamber therein;
a piston including a piston housing and a piston head slidable in said strut housing;
a preselected volume of fluid and gas located in said piston housing and said chamber and defining a constant fluid-to-gas volume ratio therein;
compensating means selectively coupled to said fluid for maintaining said fluid-to-gas volume ratio constant irrespective of thermal variations; and
valve means for selectively coupling said compensating means to said fluid.

2. The shock absorber of claim 1 wherein said compensating means includes a gas compensating chamber and a fluid compensating chamber having a movable separator piston therebetween, said fluid compensating chamber being selectively coupled to said fluid.

3. The shock absorber of claim 2 wherein said gas and fluid compensating chambers are contained within said strut housing separate from said preselected volume of fluid and gas.

4. The shock absorber of claim 2 wherein said strut housing further includes an extension beyond said closed end, said extension terminating in a second closed end and containing therein said gas and fluid compensating chambers and said movable separator piston.

5. The shock absorber of claim 2 including means for selectively coupling the fluid in said fluid compensating chamber to the fluid in said piston housing.

6. The shock absorber of claim 5 wherein said coupling means includes a hollow metering pin coupled to the closed end of said strut housing and extending into said piston housing, said pin adapted to selectively couple the fluid in said fluid compensating chamber to the fluid in said piston housing.

7. The shock absorber of claim 2 including means for selectively coupling the fluid in said fluid compensating chamber to the fluid in said chamber.

8. The shock absorber of claim 1 including means for selectively coupling said compensating means to the fluid in said piston housing.

9. The shock absorber of claim 1 including means for selectively coupling said compensating means to the fluid in said chamber.

10. The shock absorber of claim 1 wherein said volume of gas is located in said piston housing and is separated from said volume of fluid by a movable separator contained within said piston housing.

11. The shock absorber of claim 1 further including position indicator means coupled to said valve means for causing said valve means to isolate the fluid in said compensating means from said fluid when said shock absorber is positioned to receive loads.

* * * * *